(12) United States Patent
Park et al.

(10) Patent No.: US 9,658,864 B2
(45) Date of Patent: May 23, 2017

(54) METHOD AND DEVICE FOR CREATION OF INTEGRATED USER INTERFACE

(75) Inventors: Kyung Mo Park, Seoul (KR); Seo Young Hwang, Suwon-si (KR); Jae Yeon Song, Seoul (KR)

(73) Assignee: Samsung Electronics Co., Ltd (KR)

( * ) Notice: Subject to any disclaimer, the term of this patent is extended or adjusted under 35 U.S.C. 154(b) by 716 days.

(21) Appl. No.: 12/848,322

(22) Filed: Aug. 2, 2010

(65) Prior Publication Data

US 2011/0041078 A1 Feb. 17, 2011

(30) Foreign Application Priority Data

Jul. 31, 2009 (KR) .......................... 10-2009-0070329

(51) Int. Cl.
*G06F 9/44* (2006.01)
*G06F 3/0481* (2013.01)

(52) U.S. Cl.
CPC .......... *G06F 9/4443* (2013.01); *G06F 3/0481* (2013.01)

(58) Field of Classification Search
None
See application file for complete search history.

(56) References Cited

U.S. PATENT DOCUMENTS

| 5,226,109 A * | 7/1993 | Dawson et al. ............ 345/420 |
| 5,408,653 A * | 4/1995 | Josten et al. |
| 5,596,702 A * | 1/1997 | Stucka et al. ................ 715/746 |
| 5,684,967 A * | 11/1997 | McKenna et al. ............ 715/853 |
| 5,760,770 A * | 6/1998 | Bliss et al. ...................... 715/745 |
| 5,764,226 A * | 6/1998 | Consolatti et al. ........... 715/747 |
| 5,801,699 A * | 9/1998 | Hocker et al. ................ 715/837 |
| 6,300,947 B1 * | 10/2001 | Kanevsky ...................... 715/866 |
| 6,388,685 B1 * | 5/2002 | Minoura et al. .............. 715/788 |
| 7,228,347 B2 * | 6/2007 | Yoshio .......................... 709/223 |
| 7,315,985 B1 * | 1/2008 | Gauvin et al. ................ 715/734 |
| 8,001,299 B2 | 8/2011 | Hutter et al. |
| 8,015,494 B1 * | 9/2011 | Hull et al. .................... 715/746 |
| 8,286,199 B1 * | 10/2012 | Pulaski et al. ................ 719/329 |
| 8,793,589 B2 | 7/2014 | Hull et al. |
| 2002/0154168 A1 * | 10/2002 | Ijas et al. ...................... 345/764 |

(Continued)

FOREIGN PATENT DOCUMENTS

| JP | 2007-310895 | 11/2007 |
| JP | 4138231 | 6/2008 |

(Continued)

OTHER PUBLICATIONS

Russian Office Action dated Oct. 6, 2014 issued in counterpart application No. 2012103179/08.

(Continued)

*Primary Examiner* — Ryan Barrett
(74) *Attorney, Agent, or Firm* — The Farrell Law Firm, P.C.

(57) ABSTRACT

A method and device for creating an integrated User Interface (UI) by combining individual application UIs. The device receives application UIs from individual UI providing devices, combines the application UIs into the integrated UI, and displays the integrated UI. When an application UI is selected from the integrated UI, the device sends a function invocation signal to a corresponding device in order to perform the particular function corresponding to the selected application UI.

8 Claims, 4 Drawing Sheets

(56) References Cited

U.S. PATENT DOCUMENTS

| | | | |
|---|---|---|---|
| 2002/0196287 A1* | 12/2002 | Taylor et al. | 345/792 |
| 2003/0164862 A1* | 9/2003 | Cadiz et al. | 345/838 |
| 2003/0200371 A1 | 10/2003 | Abujbara | |
| 2003/0220969 A1 | 11/2003 | Kojima et al. | |
| 2004/0024819 A1* | 2/2004 | Sasaki et al. | 709/205 |
| 2004/0032429 A1* | 2/2004 | Shah et al. | 345/771 |
| 2004/0070608 A1* | 4/2004 | Saka | 345/748 |
| 2004/0098513 A1* | 5/2004 | Hutter | H04L 12/2803 709/250 |
| 2004/0201628 A1* | 10/2004 | Johanson et al. | 345/764 |
| 2005/0071769 A1* | 3/2005 | Suzuki et al. | 715/762 |
| 2005/0270307 A1* | 12/2005 | Jacques Brouaux | 345/619 |
| 2006/0053389 A1* | 3/2006 | Michelman | 715/775 |
| 2006/0069604 A1 | 3/2006 | Leukart et al. | |
| 2006/0069764 A1* | 3/2006 | Azuma et al. | 709/223 |
| 2006/0136835 A1* | 6/2006 | Hochmuth et al. | 715/779 |
| 2006/0150109 A1* | 7/2006 | Schultz et al. | 715/759 |
| 2006/0230156 A1* | 10/2006 | Shappir et al. | 709/227 |
| 2006/0236328 A1 | 10/2006 | DeWitt | |
| 2007/0101291 A1* | 5/2007 | Forstall et al. | 715/805 |
| 2007/0113191 A1* | 5/2007 | Keller et al. | 715/752 |
| 2007/0162864 A1* | 7/2007 | Masselle et al. | 715/765 |
| 2008/0184160 A1* | 7/2008 | Chang et al. | 715/781 |
| 2008/0201367 A1* | 8/2008 | Kim et al. | 707/104.1 |
| 2008/0215240 A1* | 9/2008 | Howard et al. | 701/213 |
| 2008/0256469 A1* | 10/2008 | Jain et al. | 715/764 |
| 2008/0282172 A1* | 11/2008 | Bayang et al. | 715/744 |
| 2008/0294986 A1 | 11/2008 | Seo et al. | |
| 2009/0019391 A1* | 1/2009 | Bechtel et al. | 715/810 |
| 2009/0063659 A1* | 3/2009 | Kazerouni et al. | 709/219 |
| 2009/0217103 A1* | 8/2009 | Borelli et al. | 714/43 |
| 2009/0293004 A1* | 11/2009 | Emam et al. | 715/762 |
| 2010/0115450 A1* | 5/2010 | Scott et al. | 715/777 |
| 2010/0257471 A1* | 10/2010 | Ang et al. | 715/769 |
| 2010/0309049 A1* | 12/2010 | Reunamaki et al. | 342/367 |
| 2011/0004851 A1* | 1/2011 | Nurmi et al. | 715/853 |
| 2011/0041078 A1* | 2/2011 | Park et al. | 715/746 |
| 2011/0161872 A1* | 6/2011 | Abramson et al. | 715/800 |
| 2011/0191690 A1* | 8/2011 | Zhang et al. | 715/746 |
| 2011/0302487 A1* | 12/2011 | McCormack et al. | 715/239 |

FOREIGN PATENT DOCUMENTS

| | | |
|---|---|---|
| KR | 1020030096286 | 12/2003 |
| RU | 2005 120 363 | 1/2007 |

OTHER PUBLICATIONS

Russian Office Action dated Sep. 29, 2015 issued in counterpart application No. 2012103179/08, 11 pages.

Korean Office Action dated Aug. 29, 2016 issued in counterpart application No. 10-2012-7002670, 7 pages.

* cited by examiner

METHOD AND DEVICE FOR CREATION OF INTEGRATED USER INTERFACE

PRIORITY

This application claims priority under 35 U.S.C. §119(a) to an application filed in the Korean Intellectual Property Office on Jul. 31, 2009, and assigned Serial No. 10-2009-0070329, the content of which is hereby incorporated by reference.

BACKGROUND OF THE INVENTION

1. Field of the Invention

The present invention relates generally to a User Interface (UI), and more particularly, to a method and device for creating a new integrated UI by combining individual application UIs received from external communication entities.

2. Description of the Related Art

A UI is a physical or virtual medium with which a user interacts with an electronic device. Normally, a UI provides an input, enabling a user to manipulate a device, and an output, enabling the device to indicate information to the user.

Conventional UIs are offered by device manufacturers and do not allow rework or modification once stored in devices.

Currently, as a great amount of and a great variety of data are processed in devices, various UIs are being studied and developed. In particular, traditional UIs that only offer simple images and text are now being replaced by newer UIs based on rich-media in which several types of data, such as text, audio, video, fonts, images, graphics, etc., are provided as integrated content.

Binary Format for Scene (BIFS), Light-weight Application Scene Representation (LASeR), etc. are known international standards for rich-media services. In particular, the LASeR specification has been designed to offer much richer user services through efficient representation and user interaction using various multimedia elements such as scene description, video, audio, image, font, text, meta-data, script, etc.

Although a device can perform various functions in connection with external devices, a UI of each individual device is still in the default stage as set by a device manufacturer. Accordingly, there is an arising need for an advanced, flexible, integrated UI that enables an extended and integrated control of other devices.

SUMMARY OF THE INVENTION

The present invention is designed to address at least the above-mentioned problems and/or disadvantages and to offer at least the advantages described below.

An aspect of the present invention is to provide a method and device for creating an integrated UI.

In accordance with an aspect of the present invention, a method is provided for creating an integrated UI from application UIs for performing particular functions. The method includes receiving a first application UI from a first individual UI providing device; receiving a second application UI from a second individual UI providing device; combining the first and second application UIs into the integrated UI with a single scene; and displaying the integrated UI.

In accordance with another aspect of the present invention, a device is provided for creating an integrated UI. The device includes a communication unit that is connected to a first UI providing device and a second UI providing device, and that is configured to receive a first application UI from the first UI providing device and a second application UI from the second UI providing device, each for performing a particular function; a control unit that combines the first and second application UIs into the integrated UI with a single scene; and a display unit that displays the integrated UI.

Other aspects, advantages, and salient features of the present invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will become more apparent from the following detailed description when taken in conjunction with the accompanying drawings, in which.

DETAILED DESCRIPTION OF EMBODIMENTS OF THE INVENTION

Figure 1:
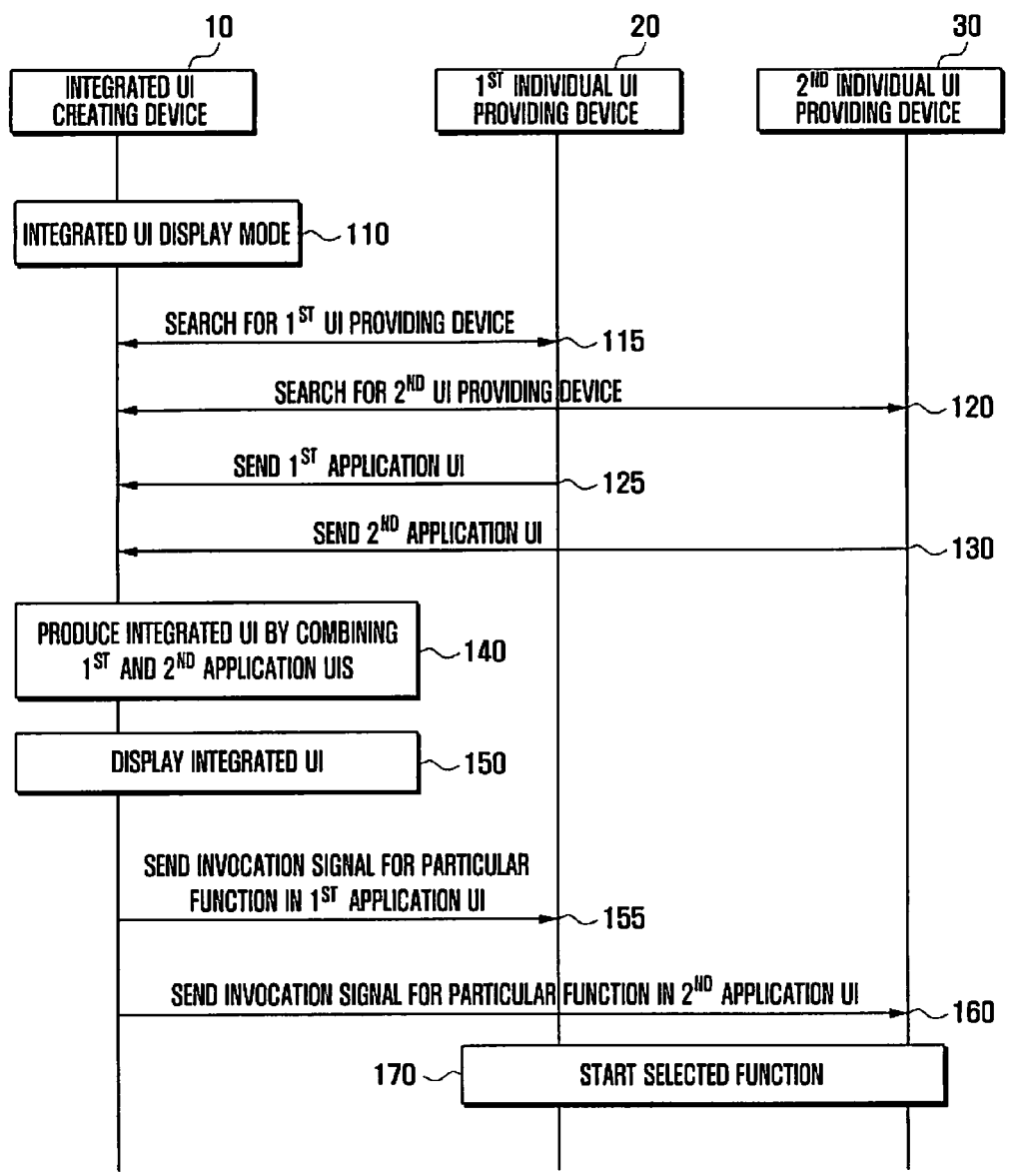
FIG. 1 is a flow diagram illustrating a signal flow between an integrated UI creating device and individual UI providing devices in accordance with an embodiment of the present invention.

Various embodiments of the present invention will now be described more fully with reference to the accompanying drawings. In the description, well known or widely used techniques, elements, structures, and processes may not be described or illustrated in detail to avoid obscuring the essence of the present invention. Although the drawings represent certain embodiments of the invention, the drawings are not necessarily to scale and certain features may be exaggerated or omitted in order to better illustrate and explain the present invention.

Among the terms set forth herein, a device refers to a piece of equipment designed to transmit and receive a variety of data to and from external communication entities through a wired or wireless connection. For instance, a device may be a mobile handset, a notebook, a stereo system, a TV, a set-top box, a network server, etc. In addition, a great variety of portable devices, multimedia players, office automation machinery, and any other communication entities may be also employed for a device set forth herein. Such a device can display any application UI selected to perform a particular function.

Hereinafter, a device will be classified into an integrated UI creating device and an individual UI providing device. An integrated UI creating device (is a device that receives individual application UIs from other devices through a wired or wireless connection, combines received individual application UIs into a single UI, i.e., an integrated UI, and then displays an integrated UI. For example, the integrated UI creating device may perform a role of a UI management engine or a widget manager.

An individual UI providing device is a device that has and displays some application UI and also provides information about it to the integrated UI creating device through a wired or wireless connection.

An application UI represents a particular executable function of a device, e.g., using graphical images such as buttons, icons, animations and vector graphics, and any other visual, aural and tactile elements. The application UI may also involve some operational elements to execute, remove, add and convert an application. Here, each application UI is mapped to an individual application for performing a particular function. Therefore, if any application UI is selected, a specific application mapped to a selected application UI may be executed. For example, the application UI can be a widget.

In a mobile device, a widget represents a frequently used function using an icon. A weather widget, an image viewer widget, a subway map widget, etc., are examples of widgets that are commonly used in a mobile device. If a user selects a weather widget for example, a mobile device may display given content related to weather.

Content refers to data that is displayed in relation to a particular function that is performed when an application UI is selected. For instance, content typically contained in a mobile device may be link data such as phone numbers, image data such as photographs, text data such as messages, etc.

A function refers to a specific activity, program, etc., that performs a particular operation in a device. For instance, a function typically performed in a mobile device is a call function, a data display function, etc.

FIG. 1 is a flow diagram illustrating a signal flow between an integrated UI creating device and individual UI providing devices in accordance with an embodiment of the present invention.

Referring to FIG. 1, an integrated UI creating device 10 is connected to at least two individual UI providing devices 20 and 30 through a wired or wireless network. Each of the individual UI providing devices 20 and 30 provides a specific individual application UI to the integrated UI creating device 10. Thereafter, the integrated UI creating device 10 creates an integrated UI by combining received individual application UIs and then displays the integrated UI.

Specifically, in step 110, the integrated UI creating device 10 starts an integrated UI display mode at a user's request. As described above, the integrated UI is a single scene involving combined application UIs, each of which is offered by the individual UI providing device and also used to perform a particular function in that device.

In steps 115 and 120, the integrated UI creating device 10 searches for the individual UI providing devices 20 and 30 through a wired or wireless connection. In steps 125 and 130, the integrated UI creating device 10 receives the first application UI and the second application UI from the first individual UI providing device 20 and the second individual UI providing device 30, respectively. Here, the individual UI providing devices 20 and 30 also send characteristic information about their respective application UI to the integrated UI creating device 10. Characteristic information includes details about media and graphic objects that constitute an application UI, including elements written in a declared form, an attribute of each element, scripts, information about mapped applications, etc.

Thereafter, the integrated UI creating device 10 decodes characteristic information about each received application UI and then checks mapped applications and objects to express each application UI by using decoded characteristic information. For example, characteristic information offered by the individual UI providing devices 20 and 30 may be written as shown in Table 1.

TABLE 1

```
<mw:messageOut name="Search">
    <mw:output name="searchString" scriptParamType="string"/>
    <mw:input name="URL" scriptParamType="string"/>
</mw:messageOut>
```

In Table 1, the <mw:messageOut> indicates that this interface can be output in a corresponding application, and also has the name attribute that denotes an interface name. Any subordinate interface may be expressed using the output factor <mw:output> and the input factor <mw:input>, each of which has the name attribute and the scriptParamType attribute.

After checking characteristic information about received application UIs, step 140, the integrated UI creating device 10 combines the first and second application UIs into an integrated UI by using characteristic information, i.e., the integrated UI creating device 10 produces an integrated UI.

More specifically, the integrated UI creating device 10 retrieves characteristic information about application UIs the individual UI providing devices 20 and 30 respectively offer. For example, retrieved characteristic information may include, but is not limited to, Graphic UI (GUI) information about size and color of modules that constitute each application UI, and information about name and attribute of interfaces that define functions of such modules. Such characteristic information may be handled in a presentation engine, a specialized module for external communications, a UI management engine, an application programming interface, a temporary memory of a system library, or any equivalent thereof. The UI management engine is often referred to as a UI manager or a widget manager and may have an extended form of a rich-media engine. The rich-media engine is an interactive media engine that can provide dynamic information in which graphic or flash technique is applied to audio and video. The UI management engine may be included in the rich-media engine, may be a specialized functional module including the rich-media engine, or may be an independent module completely separated from the rich-media engine.

The integrated UI creating device 10 checks a predefined connectivity relation between respective devices and then produces an integrated UI by using retrieved characteristic information about each application UI. That is, by using an ID, a category, etc., of each application UI, the integrated UI creating device 10 retrieves connectable application UIs from among all application UIs that the respective individual UI providing devices offer.

Then the integrated UI creating device 10 produces an integrated UI by combining retrieved application UIs. Here, an integrated UI includes application UIs, each of which is offered by the individual UI providing device 20 or 30, and is also used to control a particular function to be performed in that device. Accordingly, when combining the first and second application UIs into an integrated UI, the integrated UI creating device 10 performs a mapping of retrieved characteristic information to each application UI displayed in an integrated UI.

In step 150, the integrated UI creating device 10 displays an integrated UI that involves application UIs for the individual UI providing devices 20 and 30. Here, the integrated UI creating device 10 may reconfigure the position, shape, etc., of the respective application UIs in the integrated UI and may also manage and control each application UI.

In steps 155 and 160, when each of the first and second application UIs is selected in the integrated UI, the integrated UI creating device 10 sends a function invocation signal to each of the first and second individual UI providing devices 20 and 30. Here, a function invocation signal starts a particular function in the individual UI providing device 20 or 30. Accordingly, in step 170, after receiving a function invocation signal, each of the first and second individual UI providing devices 20 and 30 starts a selected function.

Figure 2:
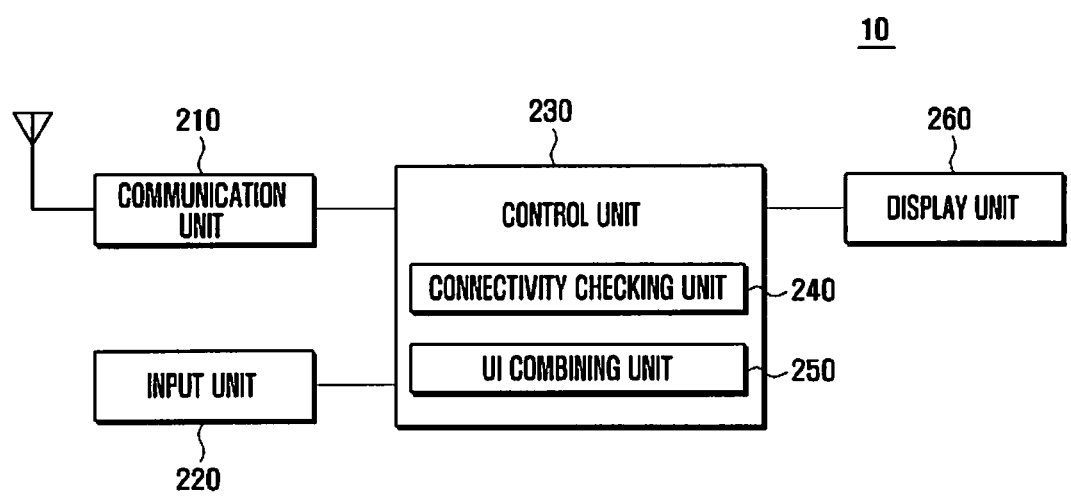
FIG. 2 illustrates an integrated UI creating device in accordance with an embodiment of the present invention.

FIG. 2 illustrates an integrated UI creating device in accordance with an embodiment of the present invention.

Referring to FIG. 2, the integrated UI creating device 10 includes a communication unit 210, an input unit 220, a control unit 230, a connectivity checking unit 240, a UI combining unit 250, and a display unit 260. Here, the connectivity checking unit 240 and the UI combining unit 250 are included in the control unit 230.

The communication unit 210 establishes a wired or wireless connection with at least one of other devices, i.e., external communication entities, and then sends and/or receives data to and/or from the connected devices, under the control of the control unit 230. Particularly, the communication unit 210 receives a signal including characteristic information about at least one application UI (hereinafter, referred to as an application UI signal), from at least one individual UI providing device for offering application UIs. Thereafter, the communication unit 210 delivers a received application UI signal to the control unit 230. The communication unit 210 may also send a function invocation signal to a corresponding individual UI providing device under the control of the control unit 230. As described above, the function invocation signal starts a particular function corresponding to a specific application UI selected by a user.

The input unit 220 creates various input signals depending on user instructions and delivers various input signals to the control unit 230. The input unit 220 may include, but is not limited to, a touch screen, a keypad, a remote control, or any other equivalent. Particularly, the input unit 220 sends an input signal indicating an application UI selected by a user to the control unit 230.

The control unit 230 controls the states and operations of elements in the integrated UI creating device 10. Particularly, the control unit 230 produces an integrated UI by combining individual application UIs received from the respective individual UI providing devices and then controls a display of the integrated UI.

More specifically, when an integrated UI display mode is selected to display a single scene involving several application UIs that are offered by the respective individual UI providing devices, the control unit 230 performs a search for individual UI providing devices by controlling the communication unit 210. The control unit 230 receives at least one application UI signal from the individual UI providing devices through the communication unit 210. Additionally, the control unit 230 decodes received application UI signals to application UI characteristic information, combines application UIs received respectively from the individual UI providing devices into an integrated UI by using decoded characteristic information, and displays an integrated UI on the display unit 260. Therefore, an integrated UI involves application UIs, each of which is used to perform a corresponding function. When one of application UIs included in the integrated UI is selected through the input unit 220, the control unit 230 sends a function invocation signal corresponding to a selected application UI to the individual UI providing device through the communication unit 210.

In order to display an integrated UI, the control unit 230 retrieves characteristic information about each application UI. As described above, characteristic information includes graphic objects, information about mapped applications, attribute information, etc.

Thereafter, the control unit 230 checks a connectivity relation between the individual UI providing devices through retrieved characteristic information, and produces an integrated UI according to a connectivity relation. As illustrated in FIG. 2, the control unit may include the connectivity checking unit 240 and the UI combining unit 250.

The connectivity checking unit 240 may check a connectivity relation between the individual UI providing devices offering application UIs.

For example, the connectivity checking unit 240 may check application UI connectivity by examining a list of connectivity relations. This list may be stored in the integrated UI creating device 10. This list may be stored as default by a device manufacturer or may be offered in advance by an application UI provider such as a service operator.

The integrated UI creating device 10 may manage a list of connectivity relations between the individual UI providing devices and also retrieve a connectivity relation through a predefined interface as shown below in Table 2. Table 2 is directed to the integrated UI creating device 10 as a widget manager and an individual UI as a widget.

TABLE 2 interface MPEGWidget extends Widget {
    InterfaceHandler[ ] getInterfaceHandlersByType(in DOMString interfaceType);
    attribute Function onInterfaceBind;
    attribute Function onInterfaceUnbind;
    attribute Function onActivation;
    void activateComponentWidget(in DOMString componentID);
    void deactivateComponentWidget(in DOMString componentID);

The getInterfaceHandlersByType method enables a Widget to retrieve an array of objects implementing the InterfaceHandler interface of the given type, and representing bound interfaces.

The function onInterfaceBind can be set to a function that will be called by the widget manager, upon the binding of any interface. The function onInterfaceUnbind can be set to a function that will be called by the widget manager, upon the unbinding of any interface.

The function onActivation can be set to a function that will be called by the widget manager, upon activation or upon failure to activate a component. The return parameter is a Boolean indicating if the activation was a success (true) or a failure (false).

The activateComponentWidget method is called by a widget to trigger the activation of a component widget.

The deactivateComponentWidget method is called by a widget to trigger the deactivation of a component widget.

The widget manager provides an InterfaceHandler object per defined interface of the widget, as shown in Table 3.

TABLE 3 interface InterfaceHandler {
    readonly attribute DOMString bound;
    readonly attribute DOMString type;

TABLE 3-continued

```
    void invoke(in MsgHandler msgHandler, ...);
    MsgHandler msgHandlerFactory(in DOMString msgName, in
function callBackFunction);
    void invokeReply(in MsgHandler msgHandler, ...);
    MsgHandler msgHandlerFactory( );
    }
    interface MsgHandler {
        readonly attribute DOMString msgName;
        readonly attribute InterfaceHandler interfaceHandler;
    }
```

In Table 3, the bound string indicates an address (e.g., an IP Address, hostname . . . ) of the external communication entity corresponding to this InterfaceHandler object.

The type string indicates the type of the external communication entity corresponding to the InterfaceHandler object.

A script within a widget may call the invoke method from the InterfaceHandler object to send a message to the corresponding external communication entity. A message parameter indicates each external communication entity's interface declaration, in a declaration order. The Widget Manager triggers the callBackFunction, upon reception of the entity's reply, giving the MsgHandler object, enabling the script to distinguish multiple calls to the callback.

When scripts functions are called upon reception of an incoming message (i.e., because the function is declared in the mw:inputAction attribute of a <mw:messageIn> element), the script may reply to the originating communication entity.

The invokeReply method is used to send a reply to a previous message. Upon the call to this method, the Widget Manager shall send a message back to the communication entity. The message output parameters are mapped to the method's following arguments in order.

For example, assuming that Widget A defines a method do Search, and Widget B wishes to use the service in question, a Widget Manager identifies that widget A and B are compatible for communications and connects the output of widget B to the input of widget A. Upon invocation by Widget B of the "Search" method, the Widget Manager sends a message to Widget A, which triggers a call to "SearchFunction" method. Widget A then performs its search, creates and stores an MsgHandler object and return. When the processing is done, Widget A calls the invokeReply method with the MsgHandler object and the result of its process, sending a reply message, which in turn, calls back Widget B and its myProcessSearchResults method with the result (the value of URL).

The manifest of widget A declares in an interface of type "example:search:interface" as shown in Table 4.

TABLE 4

```
<mw:messageIn name="doSearch" inputAction="searchFunction">
    <mw:input name="searchString" scriptParamType="string"/>
    <mw:output name="URL" scriptParamType="string"/>
</mw:messageIn>
```

The manifest of widget B declares in an interface of type "example:search:interface" as shown in Table 5.

TABLE 5

```
<mw:messageOut name="Search">
    <mw:output name="searchString" scriptParamType="string"/>
    <mw:input name="URL" scriptParamType="string"/>
</mw:messageOut>
```

In widget B, a script is constructed as shown in Table 6.

TABLE 6

```
void myProcessSearchResults(msgHandler, URL) { ... }
    var                             ifce           =
widget.getInterfaceHandlersByType("example:search:interface")[0];
    var                          msgHandler       =
ifce.msgHandlerFactory("Search",myProcessSearchResults);
    ifce.invoke(msgHandler, "some message");
```

In widget A, a script is constructed as shown in Table 7.

TABLE 7

```
    var mH;
    void searchFunction(searchString) {
        ... // some code to start the search
        mH                            =
widget.getInterfaceHandlersByType("examble:search:interface")[0].
msgHandlerFactory( );
    }
    void searchFunction1( ) { // called when the search is finished
        var URL = ...
        mH.interfaceHandler.invokeReply(mH, URL);
    }
```

A list of connectivity relations may be composed as shown in Table 8 or 9, below.

Table 8 arranges a list of the second application UIs connectable to each of the first application UIs.

TABLE 8

| 1st Application UI | 1st Application UI ID | Connectable 2nd Application UI |
|---|---|---|
| Map | widget_H_Map01 | widget_H_weather01 |
|  |  | . . . |
|  |  | widget_H_weather04 |
|  |  | widget_H_cal01 |
|  |  | widget_H_cal02 |
| Weather | widget_H_weather01 | widget_H_Map01 |
|  |  | widget_H_Map02 |
|  |  | widget_H_cal01 |
|  |  | widget_H_cal02 |
| Calendar | widget_S_cal01 | widget_S_weather01 |
|  |  | widget_S_cal01 |

When a list of connectivity relations is defined as shown in Table 8, the connectivity checking unit 240 determines which of the second application UIs offered by the second individual UI providing device 30 can be combined with each of the first application UIs offered by the first individual UI providing device 20. For example, if the first application UI is a map application UI, the connectivity checking unit 240 ascertains the ID, widget_H_Map01, of a map application UI through retrieved characteristic information about the first application UI. Thereafter, the connectivity checking unit 240 finds the IDs of connectable application UIs in the connectivity relation list. As shown in Table 8, connectable application UIs are widget_H_weather01, . . . , widget_H_weather04, widget_H_cal01, and widget_H_cal02, for example. Additionally, the connectivity checking unit 240 checks characteristic information about the second application UIs offered by the second individual UI providing device 20 and then retrieves the second application UIs corresponding to connectable application UIs included in the connectivity relation list.

Table 9 arranges a group of the second application UIs connectable to each of the first application UIs.

TABLE 9

| 1st Application UI | 1st Application UI ID | Connectable 2nd Application UI |
|---|---|---|
| Map | widget_H_Map01 | widget_Group_H_01 |
| Weather | widget_H_weather01 | widget_Group_H_01 |
|  |  | widget_Group_H_02 |
| Calendar | widget_S_cal01 | widget_Group_S_01 |

When a list of connectivity relations is defined as shown in Table 9, the connectivity checking unit 240 checks which group of the second application UIs can be combined with each of the first application UIs. All application UIs that can be displayed in individual UI providing devices are included in application UI groups and the ID is assigned to each application UI group. In a mobile device, application UI groups may be a game application UI, a weather application UI, a calendar application UI, a call application UI, etc.

The following example is a method of checking connectable application UIs through application UI groups.

If a first application UI is a calendar application UI, the connectivity checking unit 240 ascertains an ID, widget_S_cal01, of a calendar application UI through retrieved characteristic information about the first application UI. Thereafter, the connectivity checking unit 240 finds the group IDs of connectable application UIs in the connectivity relation list. As shown in Table 9, the group ID of the connectable application UIs is widget_Group_S_01, for example. Additionally, the connectivity checking unit 240 checks characteristic information about the second application UIs and then retrieves the second application UIs corresponding to a connectable application UI group included in the connectivity relation list.

The connectivity checking unit 240 may create a connectivity relation list whenever receiving an application UI from the individual UI providing device, and then check a connectivity relation between application UIs. For the above, the individual UI providing device includes information about connectable application UIs in characteristic information, when sending application UIs to the integrated UI creating device 10. Such information about connectable application UIs may be recorded in the form of 'aggregatable=T/F' in or in association with the application UI ID field. The connectivity checking unit 240 checks information about connectable application UIs included in characteristic information, thereby creating a connectivity relation list. Thereafter, the connectivity checking unit 240 finds connectable application UIs by comparing characteristic information about each application UI with a connectivity relation list.

Additionally, the connectivity checking unit 240 may assign a priority to each application UI offered by the individual UI providing device. When application UIs are combined into an integrated UI by the UI combining unit 250, application UIs may be selectively stored in an order of priority. This priority may be predetermined as default by a device manufacturer or may be varied according to the frequency of use.

After being checked by the connectivity checking unit 240, connectivity relation information about connectable application UIs may be formed as rich-media data, stored as a separate data regarding connectivity relation, or included in characteristic information about application UIs.

The UI combining unit 250 combines application UIs offered by the individual UI providing devices into an integrated UI by using connectivity relation information checked by the connectivity checking unit 240. For example, the UI combining unit 250 checks characteristic information about connectable application UIs, as shown in Table 10.

TABLE 10

```
<mw:interfaces>
    <mw:interface
type="urn:mpeg:mpegu:schema:widgets:core:in:2010">
        <messageIn name="setSize">
            <input name="width" scriptParamType="number"/>
            <input name="height" scriptParamType="number"/>
        </messageIn>
        <mw:messageIn name="show" inputAction="showFunction"/>
    </mw:interface>
    <mw:interface
type="urn:mpeg:mpegu:schema:widgets:core:out:2010">
        <messageOut name="setSize">
            <output name="width" scriptParamType="number"/>
            <output name="height" scriptParamType="number"/>
        </messageOut>
    </mw:interface>
```

In Table 10, <mw:interface> describes the communication capabilities of the widget for a certain type of communication. Additionally, subordinate attributes may include, but are not limited to, a type identifying the type of interface, mw:bindAction/mw:unbindAction indicating the scene construct to change or trigger, or the name of a script function to call upon the successful binding of this interface, mw:serviceProvider enabling an external search for this interface, mw:connectTo indicating the connectivity relation with this interface, mw:multipleBindings indicating connectability between this interface and other interfaces, and mw:required indicating a necessary interface when activated.

Characteristic information may include features in representation and configuration such as graphic objects, conditions for activation of functions in an integrated UI, and information about portable regions, objects, attributes, parts, functions, etc. Such characteristic information may be written in an application UI itself or a manifest, or may alternatively be formed as a separate file or data.

The following is a description regarding characteristic information assuming that an integrated UI creating device 10 as a widget manager and an individual UI as a widget.

Upon loading of this manifest, the Widget Manager retrieves the manifest of the component widgets referenced by the mw:src attribute or try to find a widget that matches the interfaces declared by the <mw:requiredInterface> elements, without actually activating the component widget. If no available widget matches the required interfaces, the behaviour, and in particular the loading of the main widget, is implementation-specific. If a matching widget is found, events for the binding of this component shall be triggered after the events for the activation of that widget are triggered.

Depending on the actual situation, the activatedAction and deactivatedAction messages may not be received, for example, when the component was already activated before the parent requested the activation of the component.

In the following example, components may be used to create template widgets. Widget A refers to a scene capable of visually grouping two objects. The manifest of A uses two components B and C, pointing to either specific widgets or to generic interfaces. Upon activation of B and C, A can be activated and its scene can indicate to the widget manager how to visually group B and C, as shown in Table 11.

TABLE 11

Context:
This is a child of a <content> element.
Expected children (in any order):

TABLE 11-continued

Zero or more <mw:requiredInterface> elements.
Attributes:
mw:src
 Indicates the URI of a component widget. If the <mw:component> element has <mw:requiredInterface> children, this attribute is optional. If there are no children, then this attribute is mandatory. The value of this attribute may be "urn:uuid:" followed by the UUID of a widget (as specified in the attribute mw:uuid of the widget element).
mw:id
 Mandatory. Indicates an ID for the component widget. The scope of this ID is limited to the widget.
mw:activateTrigger
 Optional. Indicates the scene construct that is used to trigger the activation of the component widget.
mw:deactivateTrigger
 Optional. Indicates the scene construct that is used to trigger the deactivation of the component widget.
mw:activatedAction
 Optional. Indicates the name of a scene construct that is used to receive the notification of the successful activation of the component widget.
mw:deactivatedAction
 Optional. Indicates the name of a scene construct that is used to receive the notification of the deactivation of the component widget.
mw:activateFailureAction
 Optional. Indicates the scene construct that is used to receive the notification of the failure of the activation of the component widget.

The UI combining unit 250 may define information about display positions of application UIs in an integrated UI, functions mapped to application UIs, etc. by using retrieved application UI characteristic information. Also, the UI combining unit 250 may define an operating scenario of application UIs in an integrated UI by using, for example, an operating table.

When application UIs are combined into an integrated UI, the UI combining unit 250 may define characteristic information to be maintained or not shared per application UI and also application UIs to be removed or involved. In addition, the UI combining unit 250 may determine which application UIs are appointed as the main or subordinate, depending on priority. Also, the UI combining unit 250 may perform an integrated or individual administration for information about the individual UI providing devices that offer respective application UIs involved in an integrated UI. This information may be used when an integrated UI is released or recombined.

Also included is a scenario in which a widget manager manages independent application UIs as an integrated UI. For example, a widget manager combines an application UI (A) offered by an air conditioner with other application UI (B) for offering weather information and then considers it as an independent application UI combined by the UI combining unit 250. In this case, if a certain event occurs in a weather application UI (B), a widget manager or a weather application UI (B) may send that event to an air conditioner application UI (A).

Furthermore, the control unit 230 controls the display unit 260 so that an integrated UI may be displayed. Here, a displayed integrated UI includes application UIs, each of which corresponds to a particular function of the individual UI providing device that has offered the application UI. When a certain application UI is selected, the control unit 230 ascertains a function to be performed depending on a selected application UI and then sends a function invocation signal to corresponding one of the individual UI providing devices through the communication unit 210.

The display unit 260 represents information in association with the states and operations of integrated UI creating device 10. Particularly, the display unit 260 displays an integrated UI created from at least one application UI under the control of the control unit 230.

Figure 3:
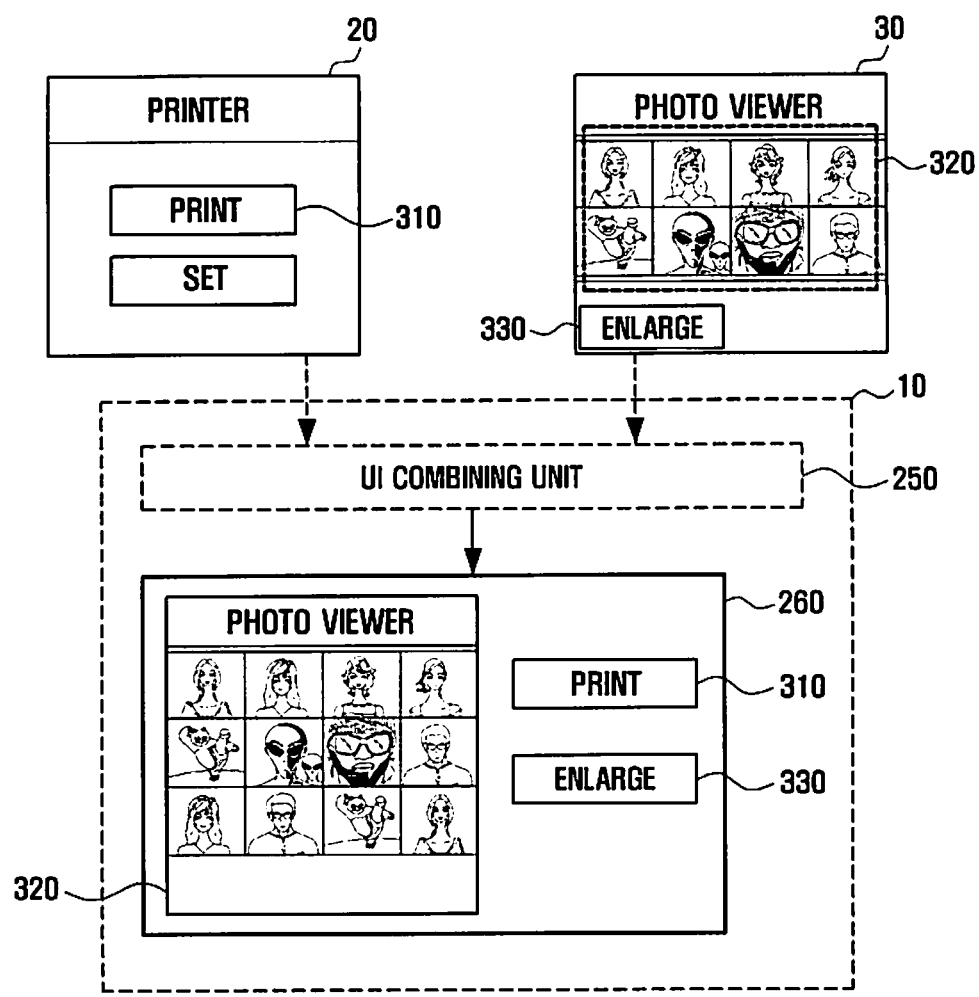
FIG. 3 illustrates an integrated UI originating from two individual application UIs in accordance with an embodiment of the present invention.

FIG. 3 illustrates an integrated UI originating from two individual application UIs in accordance with an embodiment of the present invention. In the example illustrated in FIG. 3, the integrated UI creating device 10 is a mobile device, the first individual UI providing device 20 is a printer, and the second individual UI providing device 30 is a camera.

Referring to FIG. 3, the printer 20 displays a print application UI 310 for performing a print function, and a set application UI for setting print environments. In addition, the camera 30 displays a photo viewer application UI 320 for showing a stored photo image, and an enlarge application UI 330 for enlarging a selected photo image. When the mobile device 10 sends a signal requesting application UIs, the printer 20 transmits the print application UI 310 and the set application UI to the mobile device 10, and the camera 30 transmits the photo viewer application UI 320 and the enlarge application UI 330 to the mobile device 10.

The mobile device 10 receives the print application UI 310, the set application UI, the photo viewer application UI 320 and the enlarge application UI 330 from the printer 20 and the camera 30, and then retrieves characteristic information about received application UIs. Additionally, the mobile device 10 checks a connectivity relation through the ID of each application UI in retrieved characteristic information. It is assumed herein that the print application UI 310, the photo viewer application UI 320 and the enlarge application UI 330 are connectable application UIs, and the priority is assigned to the order of the photo viewer application UI 320, the print application UI 310, and the enlarge application UI 330.

The mobile device 10 produces an integrated UI using characteristic information retrieved from application UIs received from the printer 20 and the camera 30. By checking connectivity relation information, the mobile device 10 recognizes that the print application UI 310, the photo viewer application UI 320 and the enlarge application UI 330 are connectable and the photo viewer application UI 320 has the highest priority. Therefore, the mobile device 10 combines the above connectable application UIs into an integrated UI and then displays the integrated UI on the display unit.

Thereafter, when any application UI in the integrated UI is selected, the mobile device 10 sends a function invocation signal to the corresponding individual UI providing device so that a particular function corresponding to a selected application UI may begin to be performed. If any photo image is selected in the photo viewer application UI 320 and then the print application UI 310 is further selected, the mobile device 10 sends a function invocation signal for requesting a selected photo image to the camera 30 that has offered the photo viewer application UI 320 with a higher priority. Additionally, the mobile device 10 sends a function invocation signal for printing a selected photo image to the printer 20 that has offered the print application UI 310 with the next priority. Therefore, the camera 30 sends a selected photo image to the mobile device 10, and then the mobile device 10 sends a received photo image to the printer 20. Thereafter, the printer 20 prints a received photo image.

Additionally, the mobile device 10 may receive, in advance, photo image data displayed in the photo viewer application UI 320 from the camera 30 and then, in a quick response to selection, send selected photo data to the printer 20. Alternatively, the mobile device 10 may deliver IP address or other identifying information of the printer 20 to the camera 30, and then the camera 30 may send selected photo data to the printer 20 using the IP address or other identifying information of the printer 20.

The above-described method for combining application UIs offered by the individual UI providing devices into an integrated UI is not limited to a partial transfer of functions and application characteristic information and may also include an integrated management method for the respective individual UI providing devices by using an independent application UI. For example, if the first individual UI providing device 20 offers the first application UI for controlling an air conditioner, and if the second individual UI providing device 30 offers the second application UI for performing a function of a thermometer, the integrated UI creating device 10 produces an integrated UI by combining the first and second application UIs. Thereafter, if a change in temperature is detected through the second application UI, the integrated UI creating device 10 may send a detected value of temperature to the first individual UI providing device 20 and thereby control an air conditioner.

Additionally, this method enables several devices to share application UI usage log or data with each other, such that an integrated UI may be used as the third application. For example, such application UI usage log or data may be utilized through other application UI.

Figure 4:
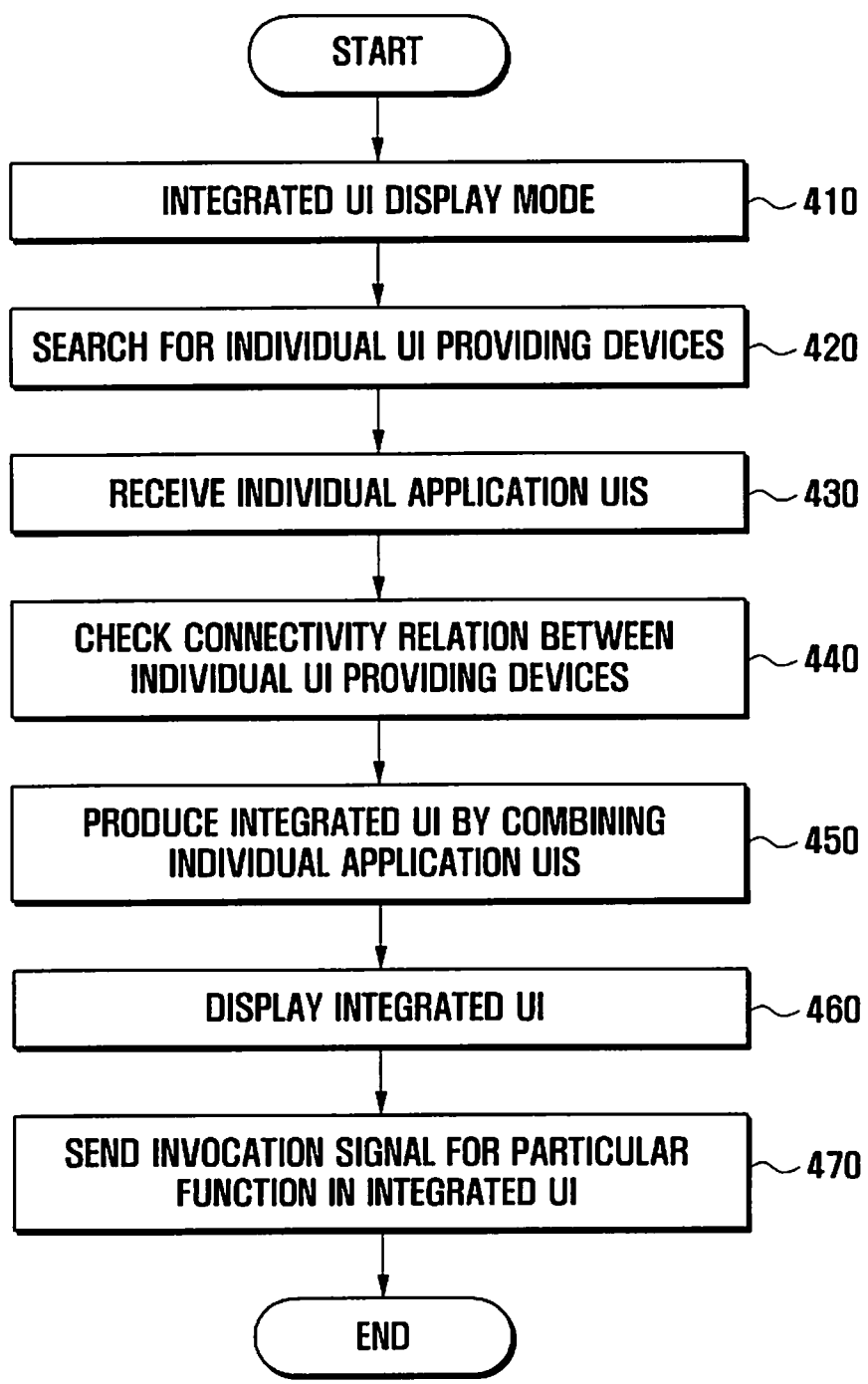
FIG. 4 is a flow diagram illustrating a method for creating an integrated UI in accordance with an embodiment of the present invention.

FIG. 4 is a flow diagram illustrating a method for creating an integrated UI in accordance with an embodiment of the present invention.

Referring to FIG. 4, in step 410, the integrated UI creating device 10 starts an integrated UI display mode. For example, the integrated UI display mode may be selected through a given menu or function key. If any application UI displayed in the integrated UI creating device is combined into an integrated UI, the integrated UI creating device may offer a pop-up window indicating that a displayed application UI is available for the integrated UI. In response to a user's selection of an integrated UI display menu, the integrated UI creating device may start the integrated UI display mode. Alternatively, when receiving at least one application UI from at least one individual UI providing device, the integrated UI creating device may offer a pop-up window enabling a user to select the integrated UI display mode.

In step 420, the integrated UI creating device performs a search for individual UI providing device through a wired or wireless connection. Although not illustrated, the integrated UI creating device 10 may send a request signal for application UIs to each individual UI providing device. This signal may be a request for currently displayed application UIs in each individual UI providing device or for selected application UIs from among all applications stored in each individual UI providing device.

In step 430, the integrated UI creating device receives at least one of the first application UIs from the first individual UI providing device and at least one of the second application UIs from the second individual UI providing device. In step 440, the integrated UI creating device checks a connectivity relation of the first and second individual UI providing devices through the received first and second application UIs. Specifically, the integrated UI creating device determines connectable application UIs by comparing a predefined connectivity relation list with characteristic information about each application UI. In addition, the integrated UI creating device determines the priority of each application UI. Although not illustrated, the integrated UI creating device may inform a user of an absence of connectable application UIs by using, for example, a pop-up window or other message, if there are no connectable application UIs.

In step 450, the integrated UI creating device combines the first and second application UIs into an integrated UI, depending on a connectivity relation. The integrated UI creating device 10 displays the integrated UI on the display unit in step 460, and sends an invocation signal to each individual UI providing device in step 470. The integrated UI creating device may send invocation signals in an order of the priorities of the selected application UIs, i.e., an invocation signal is first transmitted to an individual UI providing device having an application UI with a higher priority than other individual UI providing devices.

Although the integrated UI creating device described above combines application UIs received from the individual UI providing devices, the integrated UI creating device may also combine its own application UIs into an integrated UI. For example, the mobile device may combine a message application UI with an image display application UI into an integrated UI and then display it as a single scene. Similarly, a schedule application UI and a memo application UI may be combined into and displayed as an integrated UI.

As described above, the present invention may combine individual UIs of several devices into a single integrated UI. Additionally, such an integrated UI displayed in a device may be flexibly varied according to changes in individual UIs offered by external devices, such that a user can easily check executable functions of each device. Also, this integrated UI may enable the effective utilization of data or functions separately dispersed in several devices.

While the present invention has been particularly shown and described with reference to certain embodiments thereof, it will be understood by those skilled in the art that various changes in form and details may be made therein without departing from the spirit and scope of the present invention as defined by the appended claims.

What is claimed is:

1. A method for generating an integrated user interface (UI) by a terminal, the method comprising:
   receiving, by the terminal, first information on a first application UI including at least one UI element of the first application UI from a first device;
   receiving, by the terminal, second information on a second application UI including at least one UI element of the second application UI from a second device;
   determining, by the terminal, whether the first application UI and the second application UI are connectable as an integrated UI based on a predefined connectivity relation list that correlates UI identifiers (IDs) of UIs that are connectable, the predefined connectivity relation list comprising at least one of an application UI ID and a connectable application UI ID corresponding to the application UI ID;
   selecting, if the first application UI and the second application UI are connectable based on the result of the determination, a first UI element from the at least one UI element of the first application UI and a second UI element from the at least one UI element of the second application UI based on the predefined connectivity relation list;
   generating, by the terminal, the integrated UI using the selected first UI element and the selected second UI element;
   displaying, by the terminal, the generated integrated UI;

if data related to the second device is received from the first device, transmitting, by the terminal, the data to the second device using the integrated UI; and
transmitting, by the terminal, a signal to control at least one of the first device and the second device using the integrated UI,
wherein the first UI element is correlated with the second application UI and the second UI element is correlated with the first application UI.

2. The method of claim 1, wherein generating the integrated UI comprises:
retrieving, by the terminal, characteristic information from a plurality of application UIs, the characteristic information including at least one of a graphic object, information about a mapped application, and an identification of an application UI;
selecting, by the terminal, connectable application UIs from among the plurality of application UIs by comparing the retrieved characteristic information with the predefined connectivity relation list; and
generating, by the terminal, the integrated UI from the selected connectable application UIs.

3. The method of claim 1, further comprising:
receiving, by the terminal, an input signal corresponding to the integrated UI through an input unit; and
selecting, by the terminal, at least one of the first and second application UIs included in the integrated UI based on the input signal,
wherein the signal is
transmitted in order to invoke a particular function corresponding to the selected application UI at at least one of the first device and the second device.

4. The method of claim 1, further comprising:
receiving, by the terminal, an information signal related to the first application UI from the first device; and
transmitting, by the terminal, a function invocation signal to the second device according to the information signal.

5. A terminal for generating an integrated user interface (UI), the terminal comprising:
a communication unit configured to receive a first application UI from a first device and a second application UI from a second device;
a processor unit configured to determine whether the first application UI and the second application UI are connectable as an integrated UI based on a predefined connectivity relation list that correlates UI identifiers (IDs) of UIs that are connectable, select, if the first application UI and the second application UI are connectable based on the result of the determination, a first UI element from the at least one UI element of the first application UI and a second UI element from the at least one UI element of the second application UI based on the predefined connectivity relation list, to generate the integrated UI using the selected first UI element and the selected second UI element, and to transmit a signal to control at least one of the first device and the second device using the integrated UI, the predefined connectivity relation list comprising at least one of an application UI ID and a connectable application UI ID corresponding to the application UI ID; and
a display unit configured to display the integrated UI,
wherein if data related to the second device is received from the first device, the processor unit is further configured to transmit the data to the second device using the integrated UI, and
wherein the first UI element is correlated with the second application UI and the second UI element is correlated with the first application UI.

6. The terminal of claim 5, wherein the processor unit retrieves characteristic information from a plurality of application UIs, the characteristic information including at least one of a graphic object, information about mapped applications, and an identification of the application UIs, to select connectable application UIs from among the plurality of application UIs, by comparing the retrieved characteristic information with the predefined connectivity relation list, and generates the integrated UI from the selected connectable application UIs.

7. The terminal of claim 5, wherein the communication unit receives an input signal corresponding to the integrated UI through an input unit and the processor unit selects at least one of the first and second application UIs included in the integrated UI based on the input signal, wherein the signal is transmitted in order to invoke a particular function corresponding to the selected application UI at at least one of the first device and the second device.

8. The terminal of claim 5, wherein the communication unit receives an information signal related to the first application UI from the first device and transmits a function invocation signal to the second device according to the information signal.

* * * * *